United States Patent
Al-Fardan (10) Patent No.: US 12,327,110 B2
(45) Date of Patent: Jun. 10, 2025

(54) SOFTWARE BILL OF MATERIALS HANDSHAKE FOR CLOUD-BASED CODE EXECUTION

(71) Applicant: Cisco Technology, Inc., San Jose, CA (US)

(72) Inventor: Nadhem Al-Fardan, Budaia (BH)

(73) Assignee: CISCO TECHNOLOGY, INC., San Jose, CA (US)

( * ) Notice: Subject to any disclaimer, the term of this patent is extended or adjusted under 35 U.S.C. 154(b) by 161 days.

(21) Appl. No.: 17/898,949

(22) Filed: Aug. 30, 2022

(65) Prior Publication Data

US 2024/0069909 A1   Feb. 29, 2024

(51) Int. Cl.
G06F 8/71 (2018.01)
(52) U.S. Cl.
CPC ..................... *G06F 8/71* (2013.01)
(58) Field of Classification Search
CPC ........................................................ G06F 8/71
See application file for complete search history.

(56) References Cited

U.S. PATENT DOCUMENTS

| | | | | |
|---|---|---|---|---|
| 7,874,008 B2 * | 1/2011 | Chang | ................. | G06F 12/1458 726/21 |
| 7,971,182 B1 * | 6/2011 | Vlaovic | .................... | G06F 8/71 717/121 |
| 8,307,362 B1 * | 11/2012 | Gong | .................... | G06F 9/5077 718/1 |
| 8,352,941 B1 * | 1/2013 | Protopopov | .......... | H04L 63/102 718/1 |
| 8,819,106 B1 * | 8/2014 | Sirota | ..................... | G06F 9/485 709/227 |
| 9,792,429 B2 * | 10/2017 | Milner | .................... | G06F 21/51 |
| 9,979,780 B1 * | 5/2018 | Faibish | ............... | H04L 67/1097 |
| 10,229,276 B2 * | 3/2019 | Lester | .................... | G06F 21/10 |
| 10,324,701 B1 * | 6/2019 | Stickle | ...................... | G06F 8/63 |
| 10,491,603 B1 * | 11/2019 | Robinson | ................ | H04L 63/20 |
| 11,349,670 B1 | 5/2022 | Miller | | |
| 12,107,896 B2 * | 10/2024 | Schutt | ................... | G06F 21/577 |

(Continued)

FOREIGN PATENT DOCUMENTS

CA    3093080 A1 *  9/2019  ........... G06F 21/629

OTHER PUBLICATIONS

Kerner, Sean Michael, "Generating a Software Bill of Materials Is Becoming Essential", https://www.itprotoday.com/devops-and-software-development/generating-software-bill-materials-becoming-essential, Jul. 2, 2021, 11 pages.

(Continued)

*Primary Examiner* — Douglas M Slachta
(74) *Attorney, Agent, or Firm* — Edell, Shapiro & Finnan, LLC (57) ABSTRACT

A method, computer system, and computer program product are provided for cloud-based code execution. A computing service receives a request from a client to provide to the client a software bill of materials corresponding to the computing service. The software bill of materials is provided to the client. Executable code is received from the client, wherein the client provides the executable code based on the client analyzing the software bill of materials. In response to receiving an execution instruction, the computing service executes the executable code.

21 Claims, 6 Drawing Sheets

(56) References Cited

U.S. PATENT DOCUMENTS

| | | | |
|---|---|---|---|
| 2004/0181790 A1* | 9/2004 | Herrick | G06F 8/60 |
| | | | 717/174 |
| 2013/0111584 A1* | 5/2013 | Coppock | H04L 63/145 |
| | | | 726/22 |
| 2013/0159972 A1* | 6/2013 | Dudek | G06F 8/61 |
| | | | 717/120 |
| 2016/0378558 A1* | 12/2016 | LaMantia | G06F 9/52 |
| | | | 718/103 |
| 2017/0169229 A1* | 6/2017 | Brucker | G06F 21/566 |
| 2018/0088999 A1* | 3/2018 | Matsumoto | G06F 9/5027 |
| 2018/0115585 A1 | 4/2018 | Rubakha | |
| 2018/0276404 A1* | 9/2018 | Dotan-Cohen | G06F 21/6245 |
| 2019/0014013 A1* | 1/2019 | Poort | H04L 41/147 |
| 2019/0087161 A1* | 3/2019 | Sathe | H04L 67/12 |
| 2020/0007418 A1* | 1/2020 | Greenstein | G06F 9/5077 |
| 2020/0082336 A1 | 3/2020 | Vuppala et al. | |
| 2021/0144013 A1 | 5/2021 | Chen | |
| 2021/0165874 A1* | 6/2021 | Li | G06F 21/53 |
| 2023/0289451 A1* | 9/2023 | Mackenbach | G06Q 10/0635 |
| 2023/0367883 A1* | 11/2023 | Bussell | G06F 21/577 |

OTHER PUBLICATIONS

Jenkins, "Carbonetes Serverless Container Scanning and Policy Compliance", https://plugins.jenkins.io/carbonetes-serverless-container-scanning-and-policy-compliance/3/, downloaded Jul. 13, 2022, 3 pages.
Wikipedia, "Software supply chain", https://en.wikipedia.org/wiki/Software_supply_chain, Aug. 24, 2022, 2 pages.
National Telecommunications and Information Administration, "Software Bill of Materials", https://www.ntia.gov/SBOM, downloaded Aug. 30, 2022, 3 pages.
Wikipedia, "Function as a service", https://en.wikipedia.org/wiki/Function_as_a_service, May 4, 2022, 2 pages.
Wikipedia, "Serverless computing", https://en.wikipedia.org/wiki/Serverless_computing, Aug. 29, 2022, 5 pages.

* cited by examiner

SOFTWARE BILL OF MATERIALS HANDSHAKE FOR CLOUD-BASED CODE EXECUTION

TECHNICAL FIELD

The present disclosure relates to remote code upload and execution that utilizes a software bill of materials handshake process.

BACKGROUND

Serverless computing is a form of cloud computing in which a cloud provider allocates computing resources on demand. While the term "serverless" implies that the paradigm does not utilize servers, in actuality, a serverless computing platform may more accurately be described as a function-as-a-service (FaaS), as serverless computing employs servers in a manner that provides backend services on an as-used basis. Specifically, a serverless platform allows users to write and deploy code without having to configure any aspects relating to the underlying infrastructure, such as capacity planning, software configuration and management, maintenance, fault tolerance, scaling, and the like.

One issue with serverless computing is that, because a developer has no knowledge of the underlying infrastructure, it may be difficult to trust a serverless platform to execute code. Thus, there is no explicit assurance that a serverless platform runs the most recent or acceptable level of secure code.

DETAILED DESCRIPTION

Overview

According to one embodiment, techniques are provided for cloud-based code execution. A computing service receives a request from a client to provide to the client a software bill of materials corresponding to the computing service. The software bill of materials is provided to the client. Executable code is received from the client, wherein the client provides the executable code based on the client analyzing the software bill of materials. In response to receiving an execution instruction, the computing service executes the executable code.

EXAMPLE EMBODIMENTS

In the field of cloud computing, serverless computing refers to a paradigm in which the provider takes care of the behind-the-scenes management of servers, enabling a developer to focus primarily on the substantive features of code that the developer wishes to have executed by the cloud service. Thus, the serverless platform accepts the responsibility of performing tasks such as ensuring that the service can provide adequate computing resources to execute a developer's functions upon request, providing a software and/or hardware configuration that is compatible with the developer's code, and the like.

Conventional approaches to serverless computing provide a function-as-a-service model that is well-suited to performing backend operations, and particularly executing small pieces of code that together form a modular architecture. A key benefit of serverless computing is that a developer does not have to have knowledge of the underlying service's architecture. However, this feature can also be a detriment, as a developer consequentially is not aware of any security vulnerabilities, exploits, or other concerns that may be relevant to the code that the developer wishes to execute.

Accordingly, presented herein are techniques for granting a client of a cloud computing service (e.g., a serverless platform) greater control over how code is remotely executed by the service. In particular, present embodiments perform a software bill of materials (SBOM)-based handshake in which a remote computing service's SBOM data is requested by a client so that the client may analyze and approve the constituent components of the computing service before requesting for code to be executed. An SBOM is a list of software components of a computing entity, such as a cloud computing service, that comprehensively describes the computing entity's software configuration. Accordingly, a client can analyze an SBOM to identify whether a service contains any known components that are undesirable (e.g., a software package with a known exploit), and/or whether the service includes particular components that are mandated by the client (e.g., a particular cryptographic protocol, etc.).

The present embodiments enable a developer to select a particular service that includes software that is approved for a given computing task. Moreover, a client can even request that a service modify its configuration to achieve a desirable set of software for executing a requested function. Present embodiments thus provide several practical applications, such as an expanded degree of client-side control over cloud computing platforms, and enhanced security for computing operations. Accordingly, present embodiments provide several improvements to the technical field of cloud computing.

It should be noted that references throughout this specification to features, advantages, or similar language herein do not imply that all of the features and advantages that may be realized with the embodiments disclosed herein should be, or are in, any single embodiment. Rather, language referring to the features and advantages is understood to mean that a specific feature, advantage, or characteristic described in connection with an embodiment is included in at least one embodiment. Thus, discussion of the features, advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages will become more fully apparent from the following drawings, description and appended claims, or may be learned by the practice of embodiments as set forth hereinafter.

Figure 1:
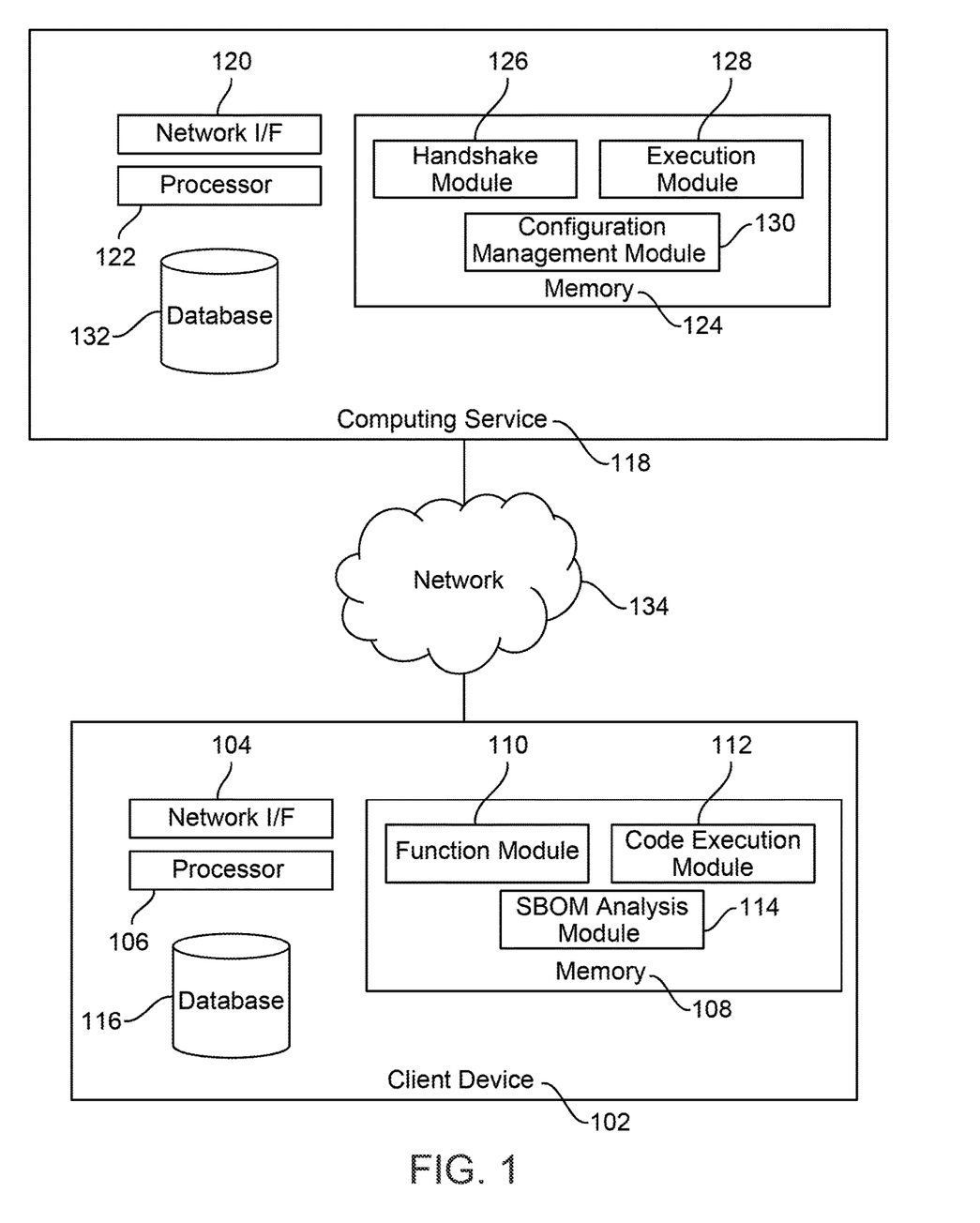
FIG. 1 is a block diagram of a computing environment, according to an example embodiment.

Embodiments will now be described in detail with reference to the Figures. FIG. 1 is a block diagram of a computing environment 100, according to an example embodiment. As depicted, computing environment 100 includes a client device 102, a computing service 118, and a network 134. It is to be understood that the functional division among components of computing environment 100 have been chosen for purposes of explaining various embodiments and is not to be construed as a limiting example.

Client device 102 includes a network interface (I/F) 104, at least one processor 106, memory 108, and a database 116. Memory 108 stores software instructions for a function module 110, a code execution module 112, and an SBOM analysis module 114. Client device 102 may include a rack-mounted server, or any other programmable electronic device capable of executing computer readable program instructions. Network interface 104 enables components of client device 102 to send and receive data over a network, such as network 134. In general, client device 102 enables a user to upload functions for remote execution by a server and causes the functions to be remotely executed. Additionally, client device 102 may perform a handshake with a service in which an SBOM of the service may be requested, analyzed, verified, approved, and the like. Client device 102 may include internal and external hardware components, as depicted and described in further detail with respect to FIG. 6.

Function module 110, code execution module 112, and SBOM analysis module 114 may include one or more modules or units to perform various functions of the embodiments described below. Function module 110, code execution module 112, and SBOM analysis module 114 may be implemented by any combination of any quantity of software and/or hardware modules or units, and may reside within memory 108 of client device 102 for execution by a processor, such as processor 106.

Function module 110 may perform various operations relating to functions, or remotely executable code, which can be uploaded to a remote service for execution in accordance with present embodiments. In some embodiments, function module 110 manages functions by obtaining functions from a repository (e.g., database 116 or a remote repository) and uploading the functions to a service for subsequent execution (e.g., according to a function-as-a-service (FaaS) model) when specified conditions are met. The functions may include any executable code in any particular format or generated by any compiler, and the functions may be configured to be remotely executed on a cloud computing service (e.g., a serverless platform).

In some embodiments, function module 110 initially selects a computing service that supports SBOM handshakes in accordance with present embodiments. Function module 110 may process a list of known or available computing services to identify one or more that are indicated as supporting SBOM handshakes. In the case that multiple computing services are identified, function module 110 may further select a particular computing service based on other considerations, such as latency, available computing resources, and the like. In some embodiments, function module 110 may provide a request to a computing service to confirm whether the computing service supports an SBOM handshake, and may identify and accordingly select a computing service based on a response indicating that the computing service does in fact support SBOM handshakes. Function module 110 may exchange data with handshake module 126 to determine whether computing service 118 supports SBOM handshakes, and may subsequently perform a handshake by also exchanging data with handshake module 126.

Once an SBOM handshake is successfully completed, function module 110 may receive an instruction to upload a function to a computing service. Function module 110 may then upload a function to the computing service (e.g., computing service 118) for future execution. In some embodiments, the function may be uploaded through a same secure connection that is also used to determine that the computing service supports SBOM handshakes and/or the same secure connection that is used to perform the SBOM handshake. In other embodiments, function module 110 may upload a function through a dedicated portal maintained by computing service 118, such as an Application Programming Interface (API). In some embodiments, function module 110 may transmit instructions to cause computing service 118 to delete, or mark for deletion, a previously uploaded function. In some embodiments, function module 110 may indicate that a function provided to computing service 118 may be deleted at a scheduled time.

Code execution module 112 transmits instructions to computing service 118 to cause computing service 118 to execute a function. In particular, the instruction to execute a function may be handled by execution module 128 of computing service 118. Code execution module 112 can instruct computing service 118 to execute a function when a predetermined condition is met and/or based on an instruction by a user. In some embodiments, code execution module 112 may provide an instruction that names a particular function to be executed and includes additional conditions or instructions, such as a time of execution, data to use as input for processing, a network-accessible location to provide the results of executing the function, and the like. Prior to transmitting an instruction to computing service 118 to execute a function, code execution module 112 may perform a check to ensure that the execution is approved based on analysis of the SBOM of computing service 118, which can be provided by SBOM analysis module 114.

SBOM analysis module 114 may receive and analyze SBOMs from any computing service that is configured to perform SBOM handshakes (e.g., computing service 118). In various embodiments, SBOM analysis module 114 may request an SBOM from a computing service, or may be provided an SBOM by another component (e.g., function module 110). The SBOM data may be arranged in a predetermined format or standard, such as a Software Identifier (SWID) format, a Software Package Data Exchange (SPDX) format, a Cyclone Data Exchange (CycloneDX) format, and the like. Accordingly, SBOM analysis module 114 can be configured to extract the identities of each software component of a computing system from its corresponding SBOM.

In order to analyze SBOM data, SBOM analysis module 114 may extract the identities of each software component included in the SBOM data and compare the extracted software components to a list of known approved or unapproved components. In some embodiments, SBOM analysis module 114 compares software components to a list of unapproved components, which can include untrustworthy components, components with known exploits, outdated components, and the like. If a computing service contains any of these unapproved components, then SBOM analysis module 114 may determine that the computing service should not be trusted, and therefore, either function module 110 is prevented from uploading a function to the service, and/or code execution module 112 is prevented from providing an instruction to execute the function. Additionally or alternatively, SBOM analysis module 114 may determine that a function can be provided to a computing service and subsequently executed based on the presence of one or more required components. In particular, SBOM analysis module 114 may scan an SBOM to determine that a computing service contains a particular required component, such as a cryptographic component that supports a particular protocol, or an antimalware component, etc.

In some embodiments, SBOM analysis module 114 determines whether to remotely execute code using a particular computing service based on a trust score for the computing service satisfying a threshold value. For example, a number of good components may contribute positively toward a trust score, and/or a number of bad components may contribute negatively toward a trust score. Components may be weighted to adjust the influence that the presence of each component has on the trust score. For example, a component relating to encryption or security may be weighted more heavily than a component that converts data from one format to another.

In some embodiments, SBOM analysis module 114 recommends modifications to the configuration of a computing system to reduce the count of, or eliminate, any unapproved components, and/or to replace a component that is neither approved nor unapproved with another required component. SBOM analysis module 114 can compare software components to a list of components to determine if any should be replaced with an alternative component, which can also be indicated in the list. If an SBOM includes a component that should be replaced with an alternative component, SBOM analysis module 114 may transmit instructions to a computing service to cause the computing service to modify its software configuration in order to replace the component with the alternative component prior to executing a function.

Database 116 may include any non-volatile storage media known in the art. For example, database 116 can be implemented with a tape library, optical library, one or more independent hard disk drives, or multiple hard disk drives in a redundant array of independent disks (RAID). Similarly, data in database 116 may conform to any suitable storage architecture known in the art, such as a file, a relational database, an object-oriented database, and/or one or more tables. Database 116 may store data including executable code (e.g., functions that can be uploaded to a computing service), input data for executable code, the results of a data processing operation, and the like. Additionally or alternatively, database 116 may store an inventory of software components, along with an indication of whether each software component is an approved or unapproved component, any weights to apply to software components, and the like.

Computing service 118 includes a network interface (I/F) 120, at least one processor 122, memory 124, and a database 132. Memory 124 stores software instructions for a handshake module 126, an execution module 128, and a configuration management module 130. Client device 102 may include a rack-mounted server, or any other programmable electronic device capable of executing computer readable program instructions. Network interface 120 enables components of computing service 118 to send and receive data over a network, such as network 134. In general, computing service 118 performs SBOM handshakes in order to receive functions from a client (e.g., client device 102) and to subsequently execute functions. Computing service 118 may include internal and external hardware components, as depicted and described in further detail with respect to FIG. 6.

Handshake module 126, execution module 128, and configuration management module 130 may include one or more modules or units to perform various functions of the embodiments described below. Handshake module 126, execution module 128, and configuration management module 130 may be implemented by any combination of any quantity of software and/or hardware modules or units, and may reside within memory 124 of computing service 118 for execution by a processor, such as processor 122.

Handshake module 126 performs operations relating to an SBOM handshake in accordance with present embodiments. When a client (e.g., client device 102) requests an SBOM that describes the configuration of computing service 118, handshake module 126 may transmit the SBOM to the client. In some embodiments, the SBOM handshake occurs in an encrypted communication session, such as a session that uses a Transport Layer Security (TLS) protocol. In some embodiments, the SBOM includes other data or metadata, such as a timestamp for the SBOM, or a nonce that is associated with the SBOM so that a remote system (e.g., client device 102) can evaluate the freshness of the SBOM data. Additionally, handshake module 126 may provide a digital signature or certificate along with an SBOM in order to authenticate that the SBOM data is genuine.

In some embodiments, handshake module 126 is protected from a denial of service (DoS) attack by limiting the number and/or rate of attempted SBOM handshakes over a time period. Handshake module 126 may limit a requesting client to a particular number and/or rate of handshakes over a time duration by using an identity of the client (e.g., network address, hostname, etc.) to track the client's behavior. In some embodiments, handshake module 126 may be executed on a separate computing node from a node that executes the function (e.g., a node hosting execution module 128). Thus, handshake module 126 may support multiple different computing services, each with their own SBOM.

Execution module 128 may execute functions when instructed by a client (e.g., client device 102). After handshake module 126 successfully completes a handshake, a function may be received and stored by computing service in a persistent storage location (e.g., database 132). When execution module 128 receives an instruction to execute a function, then execution module 128 may retrieve the function from storage, load the function into memory, obtain any other input for the function, and execute the function. Execution module 128 may store and/or transmit the results of executing the function, including output data and any metadata. In some embodiments, execution module 128 may receive an instruction authorizing execution module 128 to execute a function when a particular condition is met, such as another computing entity interacting with computing service 118, a span of time elapsing, or any other desired condition.

Configuration management module 130 may manage the software configuration of computing service 118, including the constituent software components that are used to execute functions and any settings thereof. In some embodiments, configuration management module 130 may modify a software configuration based on an instruction from a client (e.g., client device 102). The modification may include an addition, removal, or substitution of one or more software components. In some embodiments, configuration management module 130 may automatically generate an SBOM for computing service 118 in response to a request from client device 102 to perform an SBOM handshake. Alternatively, configuration management module 130 may maintain an updated SBOM, which can be automatically revised in response to detecting a change in the software configuration of computing service 118. In order to obtain a substitute software component, configuration management module 130 may access a local or remote repository that stores software components.

Database 132 may include any non-volatile storage media known in the art. For example, database 132 can be implemented with a tape library, optical library, one or more independent hard disk drives, or multiple hard disk drives in a redundant array of independent disks (RAID). Similarly, data in database 132 may conform to any suitable storage architecture known in the art, such as a file, a relational database, an object-oriented database, and/or one or more tables. Database 132 may store data including executable code (e.g., functions that can be uploaded to a computing service), input data for executable code, the results of a data processing operation, and the like. Additionally or alternatively, database 116 may store SBOM data, including any digital signatures or certificates.

Network 134 may include a local area network (LAN), a wide area network (WAN) such as the Internet, or a combination of the two, and includes wired, wireless, or fiber optic connections. In general, network 134 can be any combination of connections and protocols known in the art that will support communications between client device 102 and computing service 118 via their respective network interfaces in accordance with the described embodiments.

Figure 2:
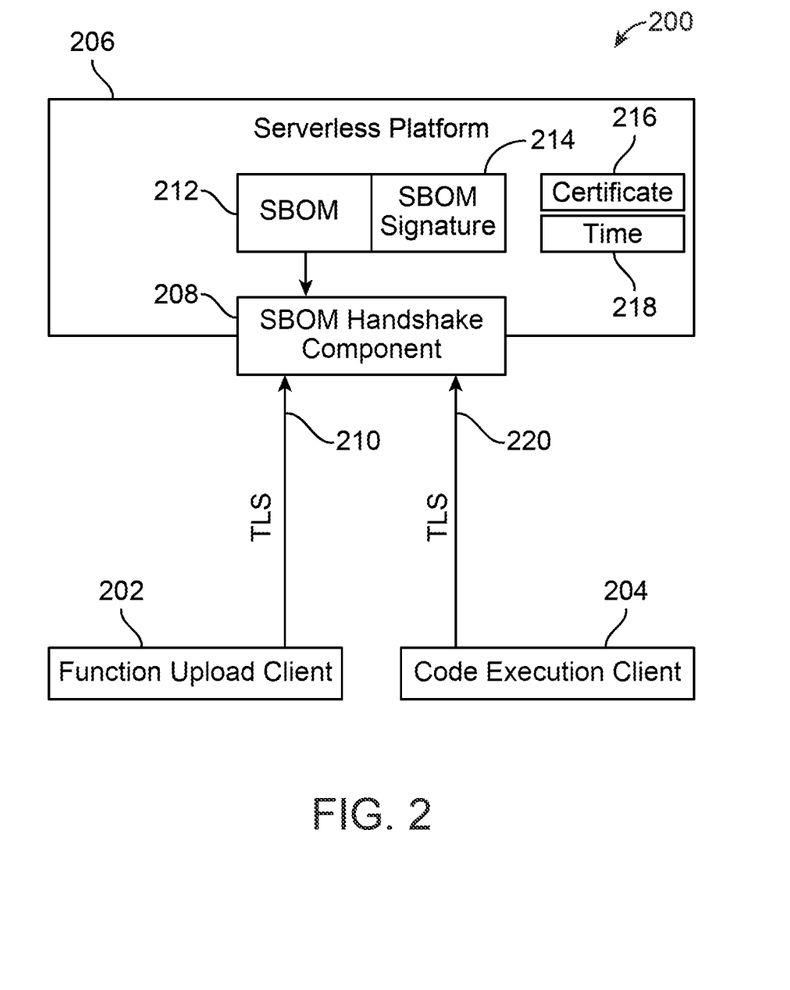
FIG. 2 is a block diagram depicting an interaction between client components and a serverless platform, according to an example embodiment.

Reference is now made to FIG. 2. FIG. 2 is a block diagram 200 depicting an interaction between client components and a serverless platform, according to an example embodiment. As depicted, the client components include a function upload client 202 and a code execution client 204, which communicate with serverless platform 206 to perform an SBOM handshake and subsequent code execution. Function upload client 202 and code execution client 204 may correspond to function module 110 and code execution module 112, depicted and described with reference to FIG. 1, and serverless platform 206 may correspond to computing service 118, likewise depicted and described with reference to FIG. 1.

As depicted, an SBOM handshake is initiated by a client interacting with SBOM handshake component 208 to determine that serverless platform 206 supports SBOM handshakes. SBOM handshake component 208 can respond to the client by acknowledging that SBOM handshakes are supported. In some embodiments, SBOM handshake component 208 may indicate one or more versions of an SBOM handshake that are supported, and/or may indicate other handshake capabilities or requirements, such as using a particular cryptographic protocol for a communication session, using a particular format of SBOM data, and the like.

To perform the handshake, function upload client 202 can request the SBOM data from SBOM handshake component 208 and SBOM handshake component 208 may accordingly provide the requested data, as represented by flow 210. The communication session corresponding to flow 210 may utilize a cryptographic protocol such as TLS. In some embodiments, function upload client 202 may request that the SBOM data be in a particular format or standard (e.g., SWID, SPDX, CycloneDX, etc.). The client can provide a nonce, which can be a predetermined, randomly generated, or pseudo-randomly generated string of characters (e.g., numbers, alphanumeric, Unicode, etc.) that can be included in the response by SBOM handshake component 208 to clarify that the SBOM data is freshly fetched for the purpose of this particular interaction.

SBOM handshake component 208 may fetch, process, and otherwise prepare data to prepare a response for the handshake. The data can include SBOM data 212, as well as an SBOM signature 214. The SBOM signature 214 may be generated by providing a keyed hash algorithm with input that includes SBOM data 212, the nonce provided by function upload client 202, a certificate 216, and a timestamp 218. Thus, SBOM handshake component 208 can reply to function upload client 202 with SBOM data that is authenticated and cryptographically secured to ensure that the contents of the SBOM can be trusted. Once the SBOM handshake response is received, processed, and approved by function upload client 202, then function upload client 202 may upload a function to serverless platform 206 for storage until instructed to execute.

Once the initial handshake is completed, code execution client 204 may provide an instruction to serverless platform 206 to execute the function that was provided in response to successful completion of the SBOM handshake. The instruction may be provided in a communication session represented by flow 220; this communication session may also use a cryptographic protocol such as TLS. In some embodiments, a second SBOM handshake may be performed to ensure that the software configuration of serverless platform 206 has not changed since the function was uploaded. For example, if a predetermined span of time has elapsed since the function was uploaded, then a second handshake may be performed. Upon execution of the function, serverless platform 206 may provide the results to code execution client 204 and/or to other locations (e.g., a network-accessible location, local storage, a third-party host or client, etc.).

Figure 3:
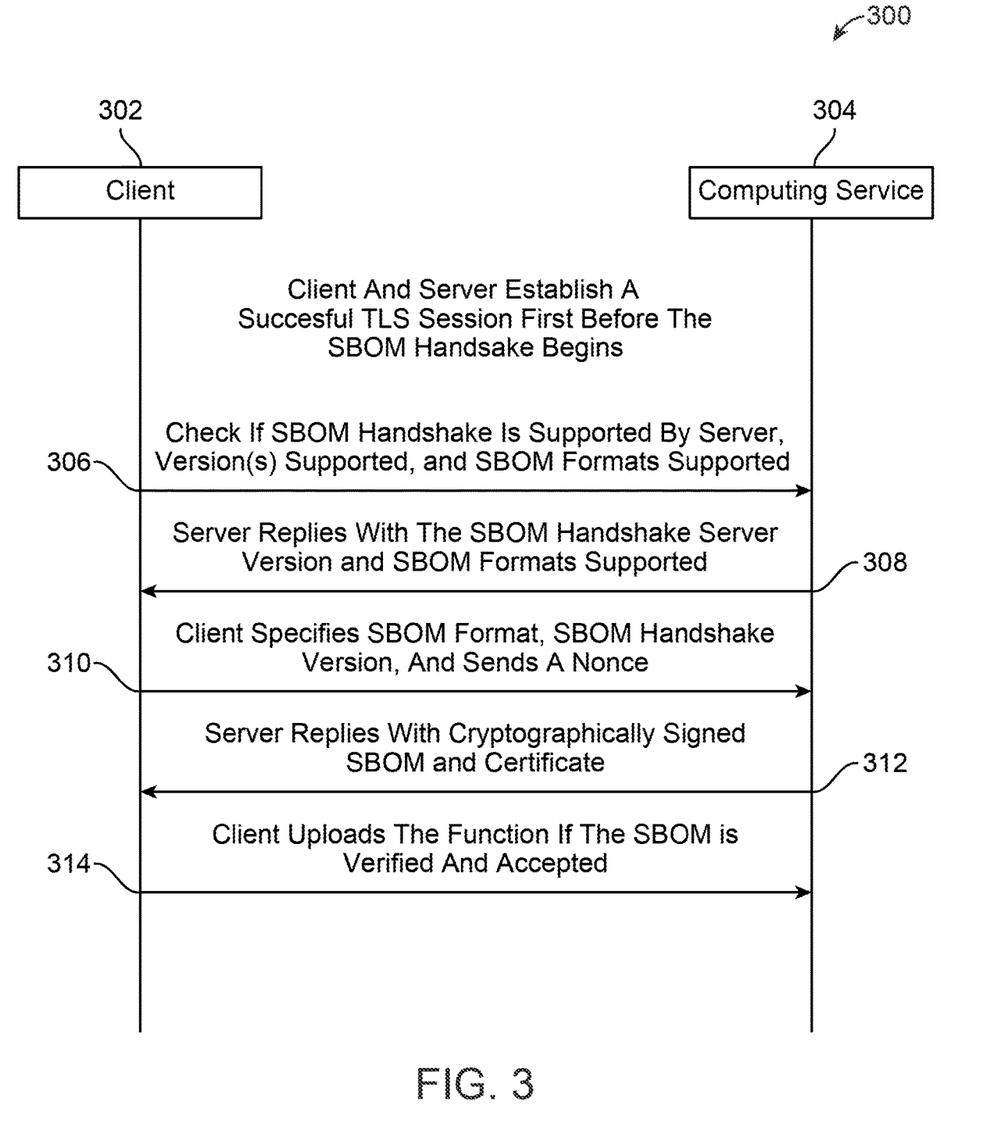
FIG. 3 is a flow diagram illustrating a handshake between a client and a computing service, according to an example embodiment.

Reference is now made to FIG. 3. FIG. 3 is a flow diagram illustrating a handshake 300 between a client 302 and a computing service 304, according to an example embodiment. Client 302 and computing service 304 may correspond to client device 102 and computing service 118, respectively, which are depicted and described in further detail with reference to FIG. 1. In some embodiments, the communications of handshake 300 are conducted using a cryptographic protocol; the private keys used by client 302 and computing service 304 may be protected using strong passwords to prevent SBOM forgery. Thus, only an authorized application on computing service 304 may be able to retrieve and use the private key that is used to cryptographically secure handshake 300.

Continuing with reference to FIG. 3, client 302 checks to determine whether an SBOM handshake is supported by computing service 304, and if so, the versions of an SBOM handshake that are supported at operation 306. Client 302 may also determine which SBOM formats are supported at operation 306. Next, computing service 304 may respond at operation 308 with a reply that indicates that computing service 304 supports an SBOM handshake for one or more SBOM formats.

At operation 310, client 302 may request an SBOM and may stipulate a format for the SBOM and/or a version of the SBOM handshake to be performed. Additionally, client 302 may include a nonce to ensure that the SBOM that will be provided is fresh.

At operation 312, computing service 304 replies with a cryptographically signed SBOM and certificate. The SBOM's contents may be arranged according to the format or standard requested by client 302. Client 302 may then analyze the SBOM to determine if computing service 304 is acceptable to use for the purpose of executing a function. If so, then client 302 may upload a function to computing service 304 at operation 314.

Figure 4:
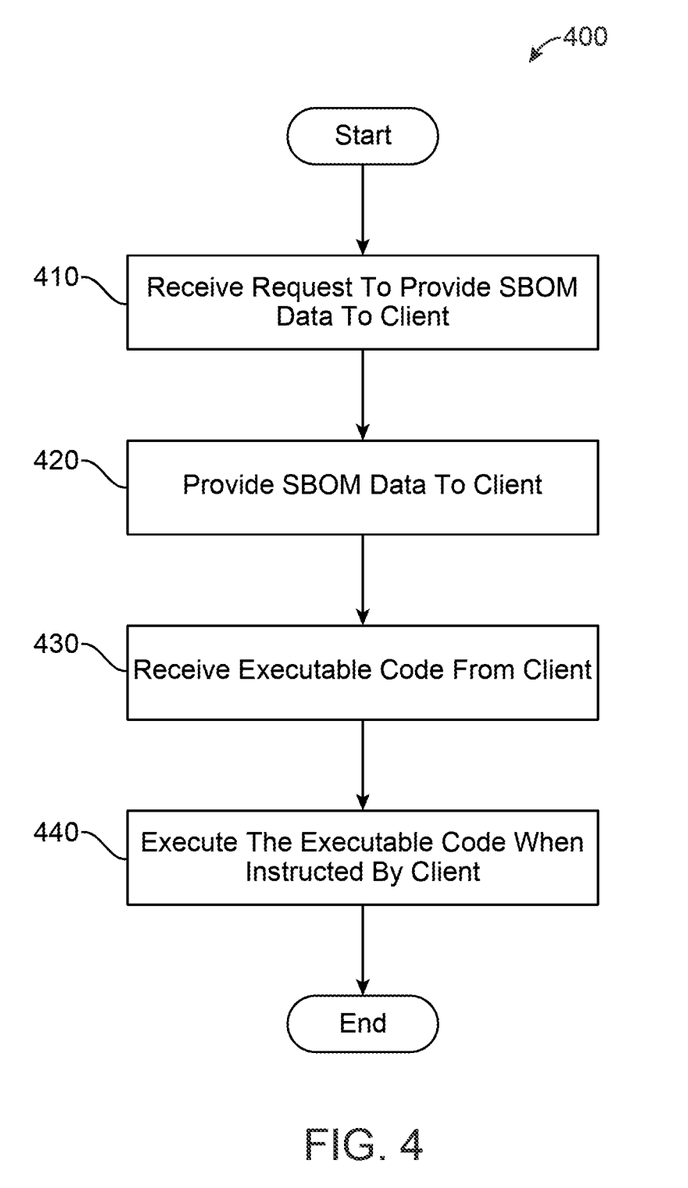
FIG. 4 is a flow chart of a method of performing cloud-based code execution, according to an example embodiment.

With reference now to FIG. 4, a flow chart is provided depicting a method 400 of performing cloud-based code execution, according to an example embodiment.

A request is received by a computing service to provide its SBOM data to the requesting client at operation 410. Initially, a communication session may be established between a computing service and a client. In some embodiments, the communication session is secured using a cryptographic protocol. In order to prevent forgery of the SBOM data, private keys for the session can be used, enabling the client to detect when an SBOM is signed by a non-trusted key. Thus, when a forged SBOM is detected, the client may terminate the connection. In response to receiving the request, the computing service may retrieve SBOM data for a response, which may also include a digital signature that signs the SBOM using a certificate's key.

The SBOM data is provided to the client at operation 420. The computing service may transmit the SBOM data plus any metadata (e.g., digital signature, timestamp, nonce, etc.) to the client for the client to analyze. The client may process the SBOM data by analyzing each software component included in the SBOM data to determine whether or not the client should use the computing service for code execution. Additionally, the client may analyze the received data to determine whether the SBOM can be trusted. For example, the client may check to see if the server certificate of the key used to sign an SBOM was revoked by consulting a certificate revocation list. Thus, the client can terminate the connection if the SBOM appears to be forged. Additionally or alternatively, the client can connect to multiple handshake servers, which can be separate computing entities that each perform SBOM handshakes on behalf of the computing service, and the client can then compare the results to determine if there is a discrepancy.

Executable code is received from the client at operation 430. When the client analyzes the SBOM of the computing service and determines that the computing service is suitable for executing code, the client may provide the executable code to the computing service. The executable code is then executed by the computing service when instructed by the client at operation 440. In some embodiments, the client subsequently transmits an instruction to cause the computing service to execute the code. Additionally or alternatively, the computing service may execute the code in response to a predefined condition being satisfied. The results of code execution may then be provided to one or more computing entities, such as a local storage, a database, the client, and the like.

Figure 5:
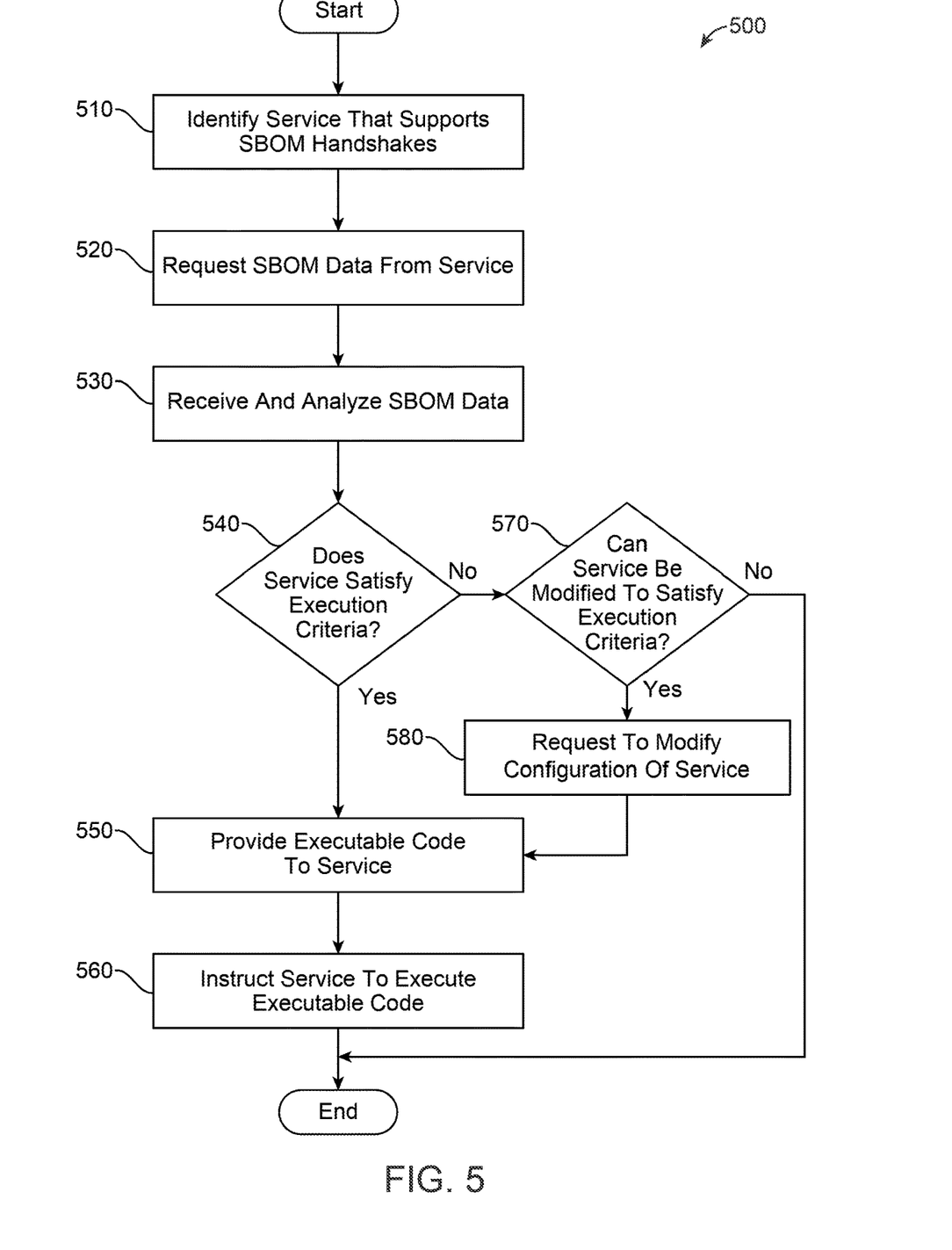
FIG. 5 is a flow chart of a method of utilizing a client to perform cloud-based code execution, according to an example embodiment.

Referring now to FIG. 5, a flow chart is shown depicting a method 500 of utilizing a client to perform cloud-based code execution, according to an example embodiment.

A computing service is identified that supports SBOM handshakes at operation 510. Initially, a client may consult a listing of computing services that are available, which may indicate particular computing services that support SBOM handshakes. Alternatively, the client may query a computing service to determine whether the computing service supports an SBOM handshake, and if so, the client may additionally request the version of the handshake, the format of SBOM data that is used, and any other details to ensure compatibility.

SBOM data is requested from the computing service at operation 520. When the client identifies a compatible computing service, the client transmits a request to the computing service for the computing service's SBOM data. The SBOM data may be authenticated using a digital signature, and may include additional details, such as a nonce (which the client initially provides), a timestamp, and the like.

The SBOM data is retrieved and analyzed at operation 530. The client can analyze the SBOM data to determine the software components that are included in the computing service's configuration, which can then be used to determine whether the computing service satisfies execution criteria for the client. The execution criteria may be satisfied by the presence or absence of specific components, or the execution criteria can be satisfied by assigning scores to each component to arrive at an overall trust score that can be compared to a threshold value. Thus, at operation 540, the client determines whether the computing service satisfies execution criteria.

If the client determines that the computing service does satisfy the execution criteria, the client then provides executable code to the computing service at operation 550. The executable code may be uploaded to the computing service via a same communication session that is used to perform the SBOM handshake (e.g., requesting and receiving SBOM data), or by another session.

At operation 560, the client instructs the computing service to execute the executable code. The instruction may be sent when a predetermined condition is satisfied or based on a request by a user. Once the instruction is received, the computing service may load the executable code into memory and execute the executable code. The results of executing the code may be provided to one or more locations indicated by the client, such as the client itself, a database, local storage, and/or a third party.

If the computing service does not satisfy the execution criteria, the client determines whether the service can be modified to satisfy the execution criteria at operation 570. If the computing service is configured to modify its software configuration based on a client's request, then the client may make a request that identifies one or more alternative software components that are to be used in the computing service's configuration in lieu of an unapproved component at operation 580. Thus, the computing service may modify its configuration and then receive and execute the executable code using the modified configuration. If the computing service cannot modify its configuration, then the computing service fails the execution criteria, and the session may be terminated by the client.

Figure 6:
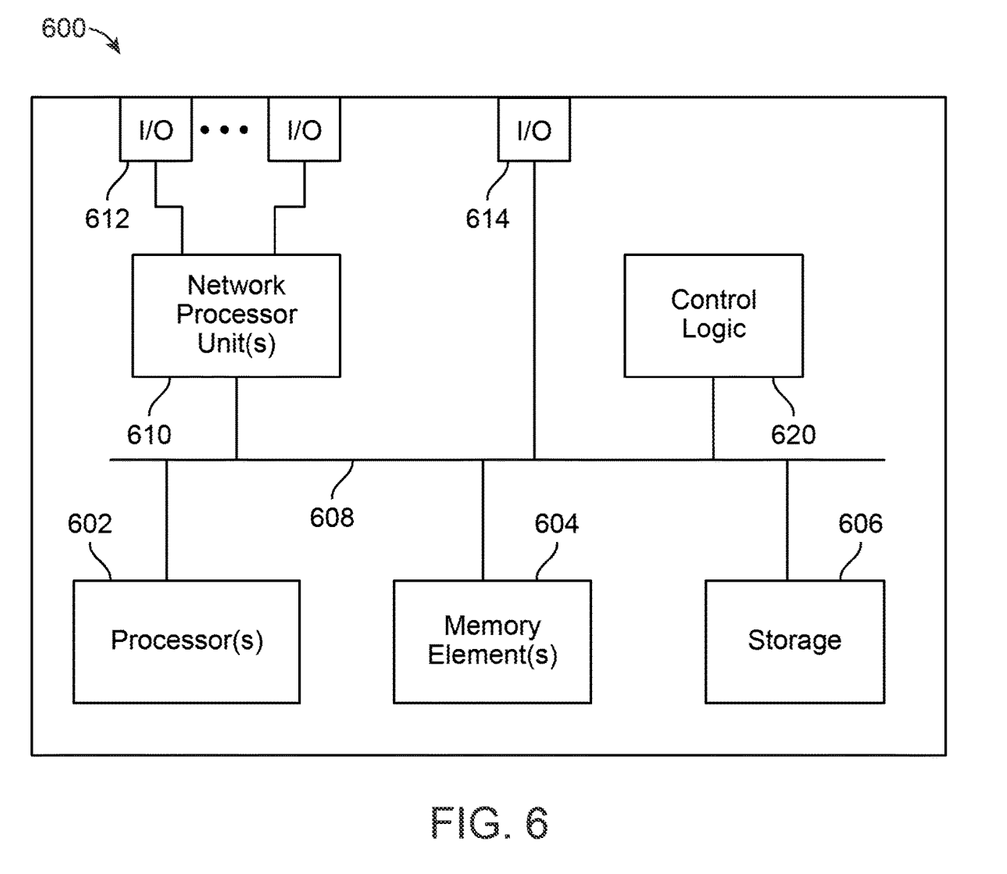
FIG. 6 is a block diagram of a device that may be configured to perform cloud-based code execution, as presented herein.

Referring now to FIG. 6, a block diagram is shown of a computing device 600 that may perform functions associated with an SBOM handshake discussed herein in connection with FIGS. 1-5.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, mouse, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In some aspects, the techniques described herein relate to a computer-implemented method including: receiving, by a computing service, a request from a client to provide to the client a software bill of materials corresponding to the computing service; providing, to the client, the software bill of materials; receiving, from the client, executable code, wherein the client provides the executable code based on the client analyzing the software bill of materials; and in response to receiving an execution instruction, executing the executable code.

In some aspects, the techniques described herein relate to a computer-implemented method, wherein the computing service is a serverless computing environment.

In some aspects, the techniques described herein relate to a computer-implemented method, wherein the client selects the computing service from a plurality of computing services based on the computing service being configured to provide the software bill of materials to the client.

In some aspects, the techniques described herein relate to a computer-implemented method, wherein a software configuration of the computing service is modified prior to executing the executable code based on a software configuration request provided by the client.

In some aspects, the techniques described herein relate to a computer-implemented method, wherein the software bill of materials includes a digital signature to authenticate that the software bill of materials corresponds to the computing service.

In some aspects, the techniques described herein relate to a computer-implemented method, wherein the software bill of materials includes a nonce.

In some aspects, the techniques described herein relate to a computer-implemented method, wherein the execution instruction causes the computing service to automatically perform a subsequently requested computing task that is requested by the client within a predetermined duration of time after the execution instruction is received by the computing service.

In some aspects, the techniques described herein relate to a computer-implemented method, wherein the request from the client indicates a particular format for the software bill of materials.

In some aspects, the techniques described herein relate to a computer system including: one or more computer processors; one or more computer readable storage media; and program instructions stored on the one or more computer readable storage media for execution by at least one of the one or more computer processors, the program instructions including instructions to: receive, by a computing service, a request from a client to provide to the client a software bill of materials corresponding to the computing service; provide, to the client, the software bill of materials; receive, from the client, executable code, wherein the client provides the executable code based on the client analyzing the software bill of materials; and in response to receiving an execution instruction, execute the executable code.

In some aspects, the techniques described herein relate to a computer system, wherein the computing service is a serverless computing environment.

In some aspects, the techniques described herein relate to a computer system, wherein the client selects the computing service from a plurality of computing services based on the computing service being configured to provide the software bill of materials to the client.

In some aspects, the techniques described herein relate to a computer system, wherein a software configuration of the computing service is modified prior to executing the executable code based on a software configuration request provided by the client.

In some aspects, the techniques described herein relate to a computer system, wherein the software bill of materials includes a digital signature to authenticate that the software bill of materials corresponds to the computing service.

In some aspects, the techniques described herein relate to a computer system, wherein the software bill of materials includes a nonce.

In some aspects, the techniques described herein relate to a computer system, wherein the execution instruction causes the computing service to automatically perform a subsequently requested computing task that is requested by the client within a predetermined duration of time after the execution instruction is received by the computing service.

In some aspects, the techniques described herein relate to a computer system, wherein the request from the client indicates a particular format for the software bill of materials.

In some aspects, the techniques described herein relate to a computer-implemented method including: providing a request, by a client, to a computing service to provide to the client a software bill of materials corresponding to the computing service; receiving the software bill of materials; analyzing the software bill of materials to determine that the computing service satisfies one or more execution criteria; and in response to determining that the computing service satisfies the one or more execution criteria, providing, to the computing service, executable code.

In some aspects, the techniques described herein relate to a computer-implemented method, further including: providing an execution instruction to the computing service to cause the computing service to execute the executable code.

In some aspects, the techniques described herein relate to a computer-implemented method, wherein the one or more execution criteria includes one or more of: a presence of a required software component, and a presence of an unapproved software component.

In some aspects, the techniques described herein relate to a computer-implemented method, wherein the client provides a modification request to the computing service to cause the computing service to modify a software configuration of the computing service.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:
1. A computer-implemented method comprising:
 receiving, by a computing service, a request from a client to provide to the client a software bill of materials describing one or more software components that are stored on the computing service;

providing, to the client, the software bill of materials;

receiving, from the client, a software configuration request based on the client analyzing the software bill of materials;

replacing, by the computing service, an untrustworthy software component of the one or more software components with an alternative trustworthy software component based on the software configuration request;

receiving, from the client, executable code, wherein the client provides the executable code based on the one or more software components; and in response to receiving an execution instruction, executing the executable code using the one or more software components.

2. The computer-implemented method of claim 1, wherein the computing service is a serverless computing environment.

3. The computer-implemented method of claim 1, wherein the client selects the computing service from a plurality of computing services based on the computing service being configured to provide the software bill of materials to the client.

4. The computer-implemented method of claim 1, wherein the software bill of materials includes a digital signature to authenticate that the software bill of materials corresponds to the computing service.

5. The computer-implemented method of claim 1, wherein the software bill of materials includes a nonce.

6. The computer-implemented method of claim 1, wherein the execution instruction causes the computing service to automatically perform a subsequently requested computing task that is requested by the client within a predetermined duration of time after the execution instruction is received by the computing service.

7. The computer-implemented method of claim 1, wherein the request from the client indicates a particular format for the software bill of materials.

8. The computer-implemented method of claim 1, wherein the client is configured to analyze the software bill of materials to determine the untrustworthy software component.

9. The computer-implemented method of claim 1, wherein the client is configured to scan the software bill of materials to determine the computing service contains a cryptographic component or an antimalware component.

10. A computer system comprising:
one or more computer processors;
one or more computer readable storage media; and
program instructions stored on the one or more computer readable storage media for execution by at least one of the one or more computer processors, the program instructions comprising instructions to:
receive, by a computing service, a request from a client to provide to the client a software bill of materials describing one or more software components that are stored on the computing service;
provide, to the client, the software bill of materials;
receive, from the client, a software configuration request based on the client analyzing the software bill of materials;
replace, by the computing service, an untrustworthy software component of the one or more software components with an alternative trustworthy software component based on the software configuration request;
receive, from the client, executable code, wherein the client provides the executable code based on the one or more software components; and
in response to receiving an execution instruction, execute the executable code using the one or more software components.

11. The computer system of claim 10, wherein the computing service is a serverless computing environment.

12. The computer system of claim 10, wherein the client selects the computing service from a plurality of computing services based on the computing service being configured to provide the software bill of materials to the client.

13. The computer system of claim 10, wherein the software bill of materials includes a digital signature to authenticate that the software bill of materials corresponds to the computing service.

14. The computer system of claim 10, wherein the software bill of materials includes a nonce.

15. The computer system of claim 10, wherein the execution instruction causes the computing service to automatically perform a subsequently requested computing task that is requested by the client within a predetermined duration of time after the execution instruction is received by the computing service.

16. The computer system of claim 10, wherein the request from the client indicates a particular format for the software bill of materials.

17. A computer-implemented method comprising:
providing a request, by a client, to a computing service to provide to the client a software bill of materials describing one or more software components that are stored on the computing service;
receiving the software bill of materials;
analyzing the software bill of materials to determine a software configuration request;
providing the software configuration request to the computing service to cause the computing service to replace an untrustworthy software component of the one or more software components with an alternative trustworthy software component; and
in response to determining that the untrustworthy software component is replaced with the alternative trustworthy software component, providing, to the computing service, executable code for execution by the computing service using the one or more software components of the computing service.

18. The computer-implemented method of claim 17, further comprising:
providing an execution instruction to the computing service to cause the computing service to execute the executable code.

19. The computer-implemented method of claim 17, wherein the untrustworthy software component is identified from a plurality of unapproved software components.

20. The computer-implemented method of claim 17, wherein the software bill of materials includes a digital signature to authenticate that the software bill of materials corresponds to the computing service.

21. The computer-implemented method of claim 17, wherein the request indicates a particular format for the software bill of materials.

* * * * *